(12) United States Patent
Dudda et al.

(10) Patent No.: US 11,304,228 B2
(45) Date of Patent: Apr. 12, 2022

(54) UTILIZATION OF UNUSED LONG-TERM UL ASSIGNMENTS

(71) Applicant: Telefonaktiebolaget LM Ericsson (publ), Stockholm (SE)

(72) Inventors: Torsten Dudda, Aachen (DE); Shehzad Ali Ashraf, Aachen (DE); John Camilo Solano Arenas, Dusseldorf (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

(21) Appl. No.: 16/485,318

(22) PCT Filed: Mar. 8, 2017

(86) PCT No.: PCT/EP2017/055481
§ 371 (c)(1),
(2) Date: Aug. 12, 2019

(87) PCT Pub. No.: WO2018/162059
PCT Pub. Date: Sep. 13, 2018

(65) Prior Publication Data
US 2019/0380148 A1 Dec. 12, 2019

(51) Int. Cl.
*H04W 74/08* (2009.01)
*H04W 72/12* (2009.01)
*H04W 74/02* (2009.01)

(52) U.S. Cl.
CPC ....... *H04W 74/0808* (2013.01); *H04W 72/12* (2013.01); *H04W 74/02* (2013.01)

(58) Field of Classification Search
CPC .. H04W 74/0808; H04W 74/02; H04W 72/12
See application file for complete search history.

(56) References Cited

U.S. PATENT DOCUMENTS 8,265,030 B2    9/2012  Miki et al.
9,743,432 B2 *  8/2017  Ji .......................... H04L 5/0048
                        (Continued)

FOREIGN PATENT DOCUMENTS

EP      3104652 A1    12/2016
JP    2008278343 A    11/2008
                    (Continued)

OTHER PUBLICATIONS

Ericsson, "SPS operation on STTI", 3GPP TSG-RAN WG2 #97, Feb. 13-17, 2017, pp. 1-3, Tdoc R2-1701610, Athens, Greece.

*Primary Examiner* — Habte Mered
(74) *Attorney, Agent, or Firm* — Coats & Bennett, PLLC (57) ABSTRACT

The invention refers to a method in an access node or evolved Node B, eNB, (110) for granting uplink, UL, transmission resources to one or a plurality of user equipments, UEs, (120-1, 120-2), comprising allocating an uplink transmission resource over one or a plurality of transmission time intervals, TTIs to a first UE (120-1); and granting an uplink transmission resource of a fraction of a certain TTI to a second UE (120-2), if it is detected that the uplink resource is not used for uplink transmission in the certain TTI by the first UE (120-1); the invention further refers to a corresponding eNB (110), corresponding first UE (120-1) a second UE (120-2), and corresponding methods performed in the UEs.

18 Claims, 10 Drawing Sheets

(56) References Cited

U.S. PATENT DOCUMENTS

| | | | | |
|---|---|---|---|---|
| 10,849,153 | B2* | 11/2020 | Futaki | H04W 72/0446 |
| 2011/0255490 | A1* | 10/2011 | Chuck | H04W 74/02 |
| | | | | 370/329 |
| 2015/0334685 | A1* | 11/2015 | Ji | H04W 72/1231 |
| | | | | 370/330 |
| 2016/0205703 | A1* | 7/2016 | Dudda | H04W 72/04 |
| | | | | 455/452.1 |
| 2016/0366682 | A1* | 12/2016 | Tseng | H04W 72/0446 |
| 2017/0171882 | A1* | 6/2017 | Sundararajan | H04W 72/1268 |
| 2017/0230997 | A1* | 8/2017 | Damnjanovic | H04W 28/26 |
| 2017/0280475 | A1* | 9/2017 | Yerramalli | H04W 28/0278 |
| 2017/0289995 | A1* | 10/2017 | Lin | H04W 72/0446 |
| 2018/0007716 | A1* | 1/2018 | Wu | H04W 74/0833 |
| 2018/0027554 | A1* | 1/2018 | Yerramalli | H04L 1/0009 |
| | | | | 370/329 |
| 2018/0234992 | A1* | 8/2018 | Shi | H04W 72/042 |
| 2018/0279348 | A1* | 9/2018 | Huang | H04W 76/27 |
| 2019/0037598 | A1* | 1/2019 | Hamidi-Sepehr | |
| | | | | H04W 72/0413 |
| 2019/0268939 | A1* | 8/2019 | Yang | H04W 72/042 |
| 2019/0335496 | A1* | 10/2019 | Li | H04W 72/14 |

FOREIGN PATENT DOCUMENTS

| | | | | |
|---|---|---|---|---|
| JP | 2011071799 | A | | 4/2011 |
| KR | 20160059483 | A | | 5/2016 |
| KR | 20160146554 | A | | 12/2016 |
| KR | 20170007313 | A | | 1/2017 |
| WO | WO-2015099585 | A1 | * 7/2015 | ........ H04W 72/0413 |
| WO | 2015179135 | A1 | | 11/2015 |
| WO | 2016099345 | A1 | | 6/2016 |
| WO | 2016103533 | A1 | | 6/2016 |

\* cited by examiner

UTILIZATION OF UNUSED LONG-TERM UL ASSIGNMENTS

TECHNICAL FIELD

The present disclosure generally relates to uplink resource allocation, and specifically refers to reusing allocated but unused uplink resources.

BACKGROUND

Packet data latency is an important performance characteristic of communications networks. There is an increasing need, e.g. with the deployment of the so-called internet of things, IOT, to provide low latency communications. One area to address when it comes to packet latency reductions is the reduction of transport time of data and control signalling, by addressing the length of a Transmission Time Interval (TTI).

In Long-Term Evolution, LTE, specified by the 3rd Generation Partnership Project 3GPP, resources for UL transmissions are granted by the radio access nodes, also being referred to as evolved NodeB, eNB in the context of LTE. This can be done dynamically, i.e. the eNB schedules the UL transmission per transmission time interval (TTI). Alternatively, this can be done using so-called semi persistent scheduling (SPS), wherein multiple TTIs may be granted at the same time, i.e. prior to a data transmission.

In LTE 3GPP standards up to Release 13, the TTI length, also called subframe length is 1 ms, consisting of 14 Orthogonal Frequency Division Multiplexing, OFDM, symbols, e.g. of length around 72 µs.

In LTE 3GPP standard Release 14, the SPS framework has been enhanced, also being referred to as 'Fast Uplink Access', to allow periodicities of 1 TTI, i.e. that consecutive TTIs are persistently allocated to a user. A further enhancement is that no padding transmission is mandated to the UE when no data is available for transmission.

Also being envisaged in the future is the concept of short TTI (sTTI), a feature where TTIs with a lengths of a fraction of 1 millisecond (ms), also being referred to as sub-1 ms TTIs are defined, e.g. TTIs having a length of 2, 4 and 7 OFDM symbols. Scheduling and resource allocation based on this short TTI level may significantly reduce the latency.

In addition to current LTE standardization, (LTE-evolution), a new radio access technology, also being referred to as NR or 5G, is also being standardized by 3GPP which will be non-backward compatible to LTE. In NR, different numerologies are foreseen to be exploited for different frequency carriers and/or for different services depending on their latency requirements. In NR, LTE numerology is being considered as the base numerology (e.g. subcarrier spacing of 15 kHz and OFDM symbol length of around 72 µs). However, for different services and/or frequency ranges $2^n$ (where, n is integer) scaling of the base numerology may also be possible. Therefore, similar to the LTE TTI shortening concept, in NR a TTI with larger subcarrier spacing has the same length as an integer number of TTIs with shorter subcarrier spacing. Furthermore, semi-persistent scheduling (or enhancements as above-cited Fast Uplink Access) may be similarly applied in NR.

One issue with providing SPS grants with a minimum possible periodicity of 1 TTI (i.e. a persistent grant) is that these resources are reserved for a certain UE, and are blocked to other users, for the duration of the SPS grant. In case parts of the resources are unused, which may typically happen for sporadic UL data transmissions, system capacity may be wasted. The resource reservation with a 1 TTI periodicity however serves to guarantee a deterministic latency for the users with the sporadic data.

SUMMARY

It is thus desired to optimize an overall system capacity by providing a solution that allows on one hand to guarantee a deterministic latency to a UE with (persistent) long TTI UL allocation (e.g. 1 ms TTI comprising 14 OFDM symbols), while on the other hand to minimize a waste of system resources when allocated resources are left unused by the UE. Thereto the long TTI is subdivided into a plurality of sub TTIs, also being referred to as short TTI, e.g. comprising 2, 4 or 7 OFDM symbols).

In an embodiment, a method to be performed in an access node or evolved Node B, eNB, is proposed for granting uplink, UL, transmission resources to one or a plurality of user equipments, UEs, comprising the steps of:
  allocating an uplink transmission resource over one or a plurality of transmission time intervals, TTIs to a first UE; and
  granting an uplink transmission resource of a fraction of a certain TTI to a second UE, if it is detected that the uplink resource is not used for uplink transmission in the certain TTI by the first UE.

In an embodiment thereto, the step of granting the uplink transmission resource of a fraction of a certain TTI to a second UE may comprise or may me realized by:
  performing a detection that the uplink resource is not used for uplink transmission in a certain TTI by the first UE; and
  in response to the detection, granting an uplink transmission resource of a fraction of the certain TTI to a second UE.

In an embodiment, UEs are grouped into different priority levels, wherein one or a plurality of first UEs (primary-priority high-priority or prioritized UEs) may be entitled to a higher priority than one or a plurality of second UEs (secondary-priority, low-priority or non-prioritized UEs). High-priority UEs may be scheduled to operate on long TTI level whereas low-priority UEs may operate on short TTI, sTTI, level.

In the following the term UE will be used for any kind of wireless terminal within the frame of 3GPP specifications, such as user terminals, machine type devices, MTC or machine-to-machine, M2M, devices.

In an embodiment, an access node or eNB adapted for granting uplink transmission resources to one or a plurality of UEs is proposed, configured to perform or trigger the steps of:
  allocating an uplink transmission resource over a transmission time interval, TTI to a first UE; and
  granting an uplink transmission resource of a fraction of a certain TTI to a second UE, if it is detected that the uplink resource is not used for uplink transmission in the certain TTI by the first UE.

The eNB may comprise a processor coupled to the one or more interfaces for signal exchange; and memory operatively coupled to the processor, the memory storing instructions to perform above-described steps.

In an embodiment, a method being performed in a first or high-prioritized UE for supporting an eNB to grant for uplink resource to a second UE is proposed, comprising the steps of:
  receiving an allocation of an uplink resource over one or a plurality of transmission time intervals, TTIs;

detecting that the uplink resource with respect to a certain TTI is or will not be used for uplink transmission by the first UE; and sending to the eNB, in response to the detection, an information indicative of that the uplink resource of the certain TTI is not used.

In an embodiment, a method being performed in a second or non-prioritized UE, for using an uplink resource that has been allocated to a first UE is proposed, comprising the steps of:

receiving from the eNB a conditional grant for an uplink resource of one or a plurality of short TTIs of a certain TTI, performing a detection, if the first UE is using the UL resource with respect to the certain TTI, and using the conditional grant for an uplink transmission, only if the detection reveals that the first UE is not using the UL resource with respect to the certain TTI.

In an embodiment first (or prioritized) UE, adapted for supporting an eNB 110 to grant for uplink, UL, resource to a second (or non-prioritized) UE is proposed, being configured to perform or to trigger the steps of:

receiving an allocation of an uplink resource over one or a plurality of transmission time intervals, TTIs;

detecting that the uplink resource with respect to a certain TTI is or will not be used for uplink transmission by the first UE; and sending to the eNB, in response to the detection, an information indicative of that the uplink resource of the certain TTI is not used.

In an embodiment, the UE comprises a processor coupled and memory operatively coupled to the processor, the memory storing instructions configured to perform or trigger the steps of the above-described embodiment.

In an embodiment, a second (or non-prioritized) UE adapted for using an uplink resource that has been allocated to a first (or prioritized) UE is proposed comprising the steps of:

receiving from the eNB a conditional grant for an uplink resource of one or a plurality of short TTIs of a certain TTI, performing a detection, if the first UE is using the UL resource with respect to the certain TTI, and using the conditional grant for an uplink transmission, only if the detection reveals that the first UE is not using the UL resource with respect to the certain TTI.

In an embodiment, the UE comprises a processor coupled and memory operatively coupled to the processor, the memory storing instructions configured to perform or trigger the steps of the above-described embodiment.

Present embodiments also concern computer programs comprising portions of software codes in order to implement the method as described above when operated by a respective processing unit of appropriate nodes, e.g. an eNB or a radio access network node, or a UE as described in the specification. The computer program(s) can be stored on a computer readable medium. The computer-readable medium can be a permanent or rewritable memory within the nodes, or located externally. The respective computer program can be also transferred for example via a cable or a wireless link as a sequence of signals.

In the following, detailed embodiments of the present invention shall be described in order to give the skilled person a full and complete understanding. However, these embodiments are illustrative and not intended to be limiting.

BRIEF DESCRIPTION OF THE DRAWINGS

The accompanying drawings illustrate several aspects of the disclosure, and together with the description serve to explain the principles of the disclosure.

DESCRIPTION

In future 5G releases, several different categories of devices having different capabilities are supposed to co-exist in the network. These devices may support the same and/or different services with different quality-of-service (QoS) requirements. One particular example is an envisaged coexistence of machine-type communication (MTC) and mobile broadband (MBB) communication. In future LTE releases, a user device may be supposed to support sub-1 ms TTI (named as short TTI, or as sTTI). However, co-existing legacy devices only supporting long TTI allocation may need to get deterministic latency services too.

One way to meet above-described requirements may be to providing SPS grant or Fast Uplink Access grant with a minimum possible periodicity (i.e. 1 TTI).

In addition to the above mentioned scenario, since with persistent or semi-persistent scheduling (SPS), typically only small parts of the carrier bandwidths, e.g. 2 subbands (i.e. 360 kHz using 15 kHz subcarrier as in LTE), are allocated, so that the rest of the bandwidth remains available for other purposes and/or users, it may be even more beneficial that the user operates its data transmission on 1 ms subframe length instead of short TTI length. This way, the transport block size (product of bandwidth and TTI length) is kept sufficiently large, so that typical UL data packets fit inside. Persistent (or semi-persistent) scheduling shall mean that a plurality of (long) TTI resources are granted to a UE, wherein the scheduled TTI may be a sequence of subsequent TTIs, TTIs according to a recurring pattern (e.g. every $2^{nd}$, $3^{rd}$, . . . , $n^{th}$ TTI of subsequent TTIs, or TTIs according to any other pattern.

However, the allocated long TTIs of this user would be unused and would not be available for other users if the user has no UL data to transmit. In order to be able to re-use the resources by another UE, a feature may be implemented, where no UL padding transmission is mandated when no UL data is available (e.g. being also referred to as Fast Uplink Access or SPS enhancement in 3GPP release 14).

In an embodiment, UEs are grouped into different priority levels, wherein one or a plurality of first UEs (primary-priority high-priority or prioritized UEs) may be entitled to a higher priority than one or a plurality of second UEs (secondary-priority, low-priority or non-prioritized UEs). High-priority UEs may be scheduled to operate on long TTI level whereas low-priority UEs may operate on short TTI, sTTI, level.

By way of example, embodiments described in the following are mainly described referring to a long TTI allocation with e.g. LTE's Fast Uplink Access on a 1 millisecond, 1 ms, level and using 2 OFDM symbols for the short TTI. It will however be well appreciated that solutions described herein are equally applicable to wireless access networks and user-equipments (UEs) implementing other access technologies and physical layer numerologies (e.g. to above-mentioned 5G/NR technologies).

Figure 1:
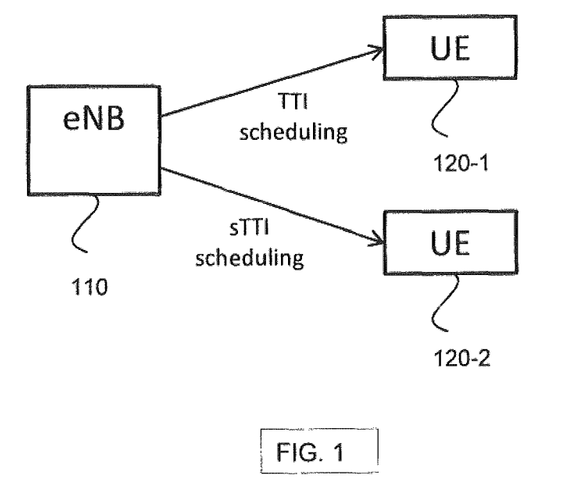
FIG. 1 shows an exemplary wireless network with an eNB and a plurality of UEs to be scheduled either on long TTIs or on short TTIs depending on an assigned priority level.

FIG. 1 shows an exemplary wireless network comprising a wireless access node or eNB 110, a first user equipment, UE, 120-1 and a second UE 120-2. By way of example, the first UE 120-1 has a (semi-)persistent resource allocation (e.g. using SPS or Fast Uplink Access procedure) and operates its UL data transmissions towards the eNB 110 on long TTI level, e.g. at 1 ms subframe length, according to current LTE specifications. Therewith, the user is able to transmit its UL data, whenever it becomes available (which cannot be estimated for sporadic data), within a guaranteed time period, e.g. a time equal or below 2 ms (that is ms waiting time for next subframe boundary+1 ms UL transmission time). Further by way of example, the second UE 120-2 does not have a persistent resource allocation and may operate its UL data transmissions towards the eNB 110 only on fractions of the long TTI that are not used by UEs with (semi-)persistent resource allocation.

In an embodiment, the first UE 120-1 is one of a first plurality of UEs to be scheduled on a long TTI grid (e.g. a Rel-14 UE operating on 1 ms TTIs), whereas the second UE 120-2 is one of a second plurality of UEs to be scheduled on a grid with a fraction of the TTI, that is being referred to as short TTI or sTTI. By way of example, an sTTI may comprise 2 OFDM symbols that is ⅐ of the duration of the long TTI. The first plurality of UEs to be scheduled on long TTI level may be regarded as high-priority UEs or prioritized UEs, and the second plurality of UEs to be scheduled on sTTI level as low-priority or non-prioritized UEs that are only allowed to use the UL transmission resources of the conditional grant, if no prioritized UE uses its scheduled transmissions.

The eNB 110 is adapted to detect gaps of an uplink, UL, transmission with respect to one or a plurality of prioritized UEs, e.g. of the first UE 120-1. This detection may take place on sTTI, level, e.g. such that a determination of whether a high-prioritized UL transmission has occurred or not is performed within an sTTI, e.g. the first sTTI of the respective TTI. After a detection that no UL transmission has occurred, the eNB 110 may schedule (or allow uplink transmission using the resources indicated in the conditional grant) one or a plurality of the non-prioritized UEs, e.g. the second UE 120-2 on the remaining unused short TTI resources within the TTI allocation. As a prioritized UE operates on TTI level, the eNB can be sure that such UE won't transmit on the remaining TTI resources anymore, when it detected that the UE did not transmit on the first short TTI resource.

In an embodiment, the UL transmission gap detection is performed by a transmission sensing of the eNB 110. In a first embodiment thereto, the detection by the eNB 110 is realized by checking if a transmission has occurred on a certain sTTI, e.g. a first sTTI of the plurality of sTTIs of the TTI by using its DTX detection capability. Alternatively, the eNB 110 may detect a gap in the UL transmission of prioritized UEs based on a received uplink power detection. Thereto, the eNB 110 may estimate the received uplink power of the first UE 120-1 and decide that no UL transmission has taken place if the estimated UL power is below a certain threshold. In an embodiment, the eNB may take such decision already on the first OFDM symbol of the TTI. In addition, the sensing may be done on clear channel access (CCA) slot basis e.g. as in WiFi or stand-alone LTE-Unlicensed or Licensed Assisted Access (LAA).

In an embodiment, the eNB receives usage indications of an UL transmission usage or activity of prioritized UEs. Thereto, a prioritized UE may inform the eNB that it will not use a long TTI for UL transmission. Such information may be performed by sending an indication on short TTI level, e.g. within the first short TTI within the long TTI. The indication may have the following properties:

According to an embodiment, a short padding indication may be used to indicate that no data is available for (long) TTI transmission in configuration wherein no padding is transmitted (skipped), if no UL data is available. In such configurations, the eNB may understand the "exceptional" short padding transmission as an indication that no data for the long TTI is available. Alternatively, a MAC CE, or buffer status report (BSR) may be transmitted on short TTI level. As a further alternative, reference symbols, e.g. uplink DMRS may be transmitted.

In an embodiment, the short padding transmission on the short TTI level may be realized as e.g. 2 OFDM symbol transmission, which is also the one configured for the other UE(s). For such transmission, a short version of the Physical Uplink Shared Channel, also being referred as sPUSCH, may be used. This may keep implementation complexity at the eNB low, as the eNB may anyway need to implement those features for the short, e.g. 2 OFDM symbol, operation of the other users. Alternatively, a minimum transmission time of 1 OFDM symbol could also be used as well.

Similar to the above-described embodiments, once the eNB has received (and processed) such "short TTI no long TTI transmission indication", the eNB may schedule the remaining resources of the long TTI to one or multiple other (low-priority) UEs.

Figure 2:
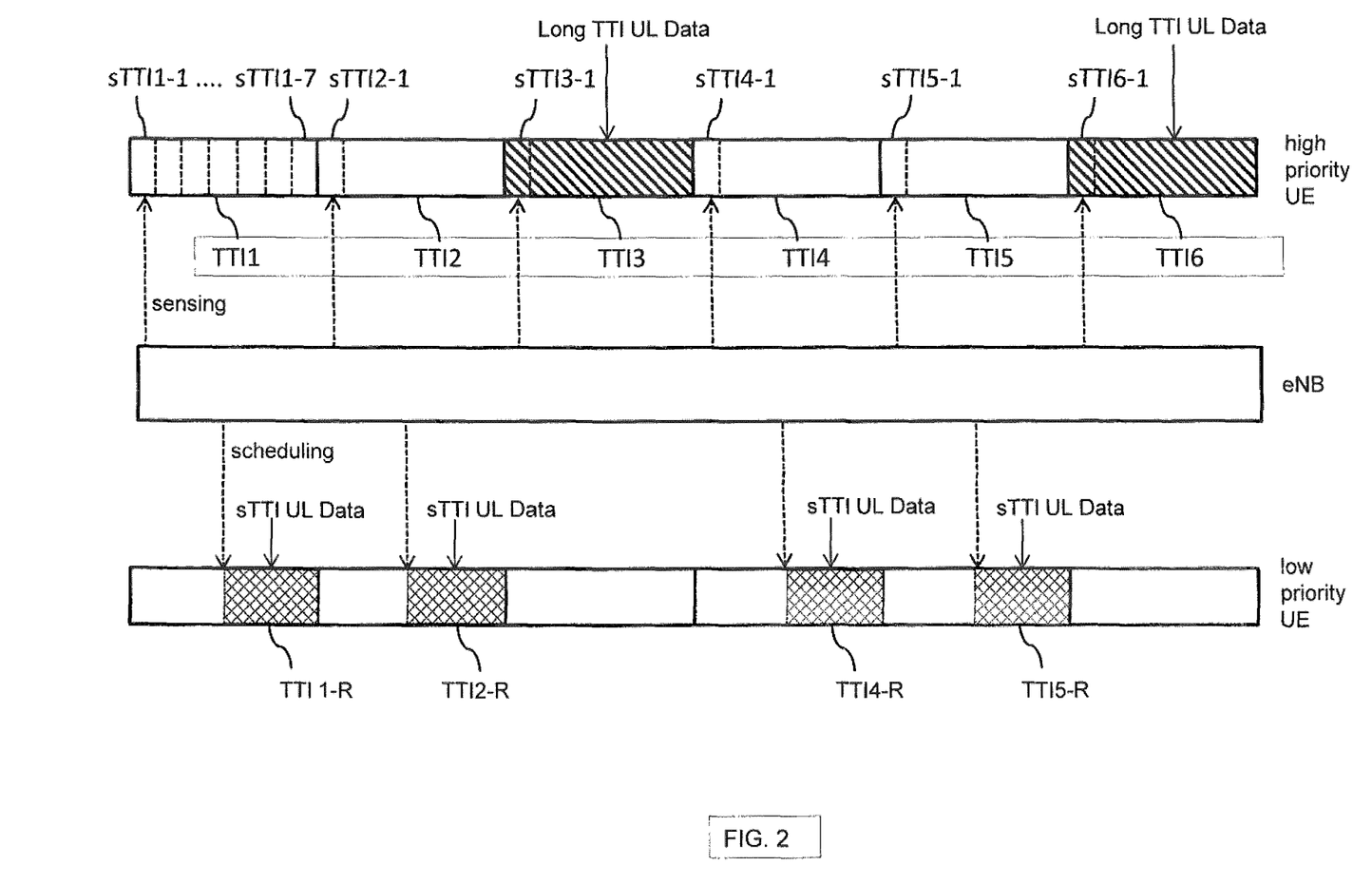
FIG. 2 shows a first exemplary timing diagram for long TTI and short TTI assignments with respect to UEs of different priority levels based on transmission sensing.

FIG. 2 shows a first example for a persistent resource allocation of a sequence of (long) TTIs to a first (prioritized) UE 120-1 by an eNB 110, and scheduling fractions of unused TTIs to a second (non-prioritized) UE 120-2. By way of example, from six subsequent TTIs, only third TTI3 and sixth TTI6 are used for UL data transmission by the first UE 120-1. Each TTI is divided into a certain number of short TTIs. By way of example, first TTI1 is shown as being divided into seven short TTIs TTI1-1, . . . ,TTI1-7. In the example of FIG. 2, the eNB 110 performs a sensing within a first short TTI of each long TTI. If the eNB 110 determines that the corresponding long TTI is unused, the eNB schedules short TTI grants of the remaining unused long TTI resource to a non-prioritized, e.g. second UE 120-2 (or allow uplink transmission using the resources indicated in the conditional grant). According to the example shown in FIG. 2, second UE 120-2 gets scheduled for fractions of long TTIs in TTI1, TTI2, TTI4 and TTI5.

Figure 3:
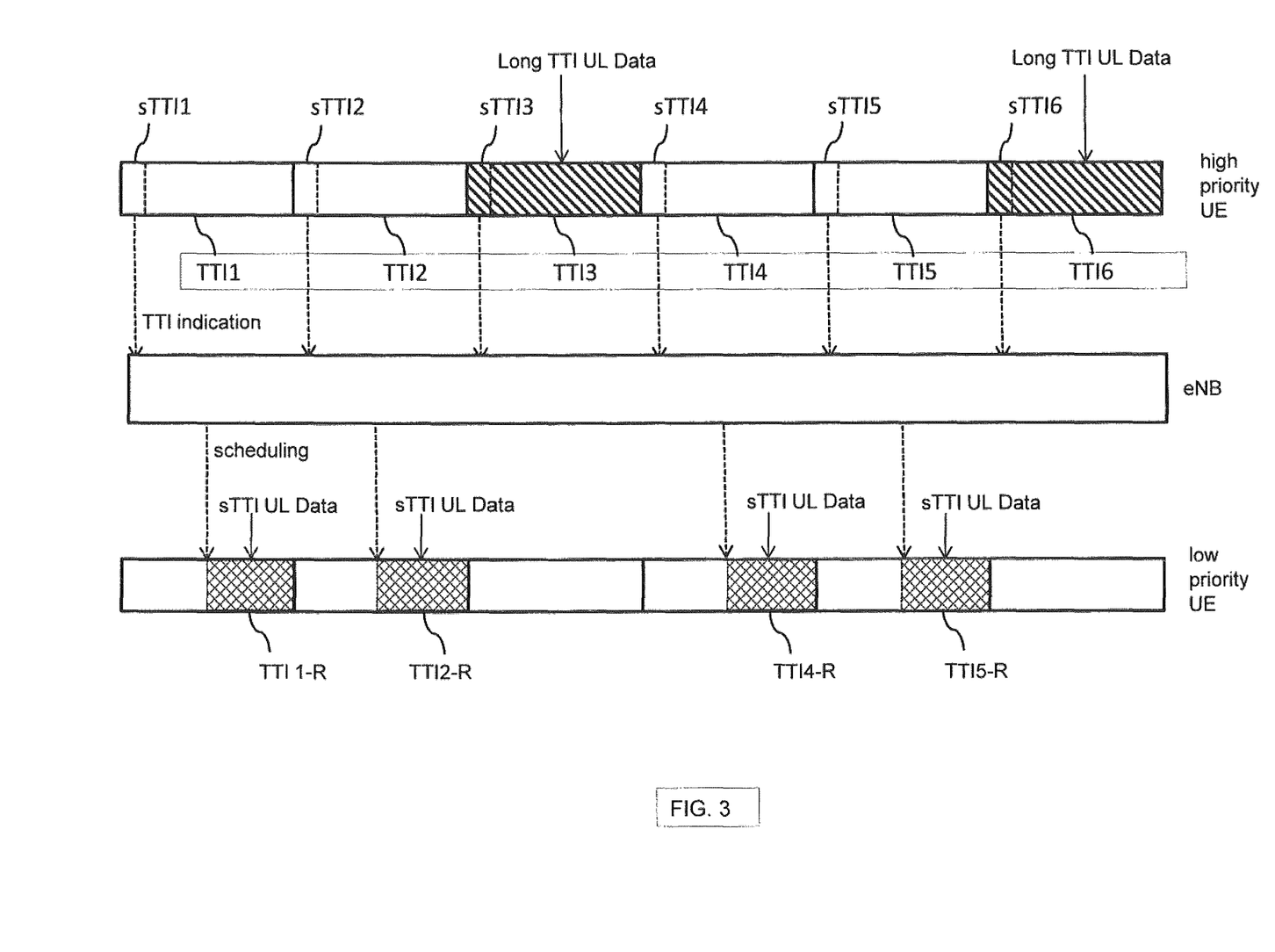
FIG. 3 shows a second exemplary timing diagram for long TTI and short TTI assignments with respect to UEs of different priority levels based on long TTI usage indication.

FIG. 3 shows a second example for a persistent resource allocation of a sequence of (long) TTIs to a first (prioritized) UE 120-1 by an eNB 110, and scheduling fractions of unused TTIs to a second (non-prioritized) UE 120-2. Similar to FIG. 2, from six subsequent TTIs, only third TTI3 and sixth TTI6 are used for UL data transmission by the first UE 120-1. In the example of FIG. 3, the prioritized UEs (e.g. first UE 120-1) send indications of TTI usage to the eNB. By way of example such TTI indications are sent if a TTI is/will not be used by the respective UE. Based on the received TTI indications, the eNB 110 schedules short TTI grants of the remaining unused long TTI resource to a non-prioritized, e.g. second UE 120-2. According to the example shown in FIG. 3, second UE 120-2 gets scheduled for fractions of long TTIs in TTI1, TTI2, TTI4 and TTI5.

As discussed, once the eNB knows that the long TTI is going to be unused, the scheduling of the remaining resources may happen based on chunks of short TTIs. For the short TTI scheduling, the eNB 110 may send fast UL grants e.g. as downlink control information, DCI, to the other users, which the other users may use after decoding.

In a further embodiment, the eNB 110 pre-schedules the same resources in time and/or frequency as allocated to the high priority UE to a plurality of low-priority UEs. Such prescheduling may be based on dedicated or common dynamic long-scale grant ("slow grant"), or on an SPS or Fast Uplink Access grant, which are valid for multiple short TTIs. Similar to the above-described embodiments, a prioritized UE always gets the priority to transmit on long TTI scale. The low-priority users have also pre-allocated resources, but may only transmit on short TTI scale (within the long TTI), if no prioritized UE is transmitting in its allocated resources.

Thereto, an eNB serving one or a plurality of high-priority UEs and one or a plurality of low-priority UEs allocates (persistent or semi-persistent) UL resources to the one or plurality of high priority UEs allowing them operation on long TTI level. At the same time, those UL resources are also allocated to the low-priority UEs but on short TTI level. Those short TTI resources, however, are restricted to be used until the eNB in a next step allow it. In other words, the eNB provides a conditional grant of short TTI resources to the low-priority UEs.

Since with the communication about the conditional grant the low-priority users already have the scheduling information, the further information to be transmitted by the eNB may comprise only a few bits. Thus, the processing time can be significantly reduced.

Thereto, a low priority user may detect that the first user or high priority user has not transmitted in its allocated resources. This detection procedure can be realized any channel sensing mechanism, e.g.

by a channel sensing mechanism (e.g. energy detection) being performed in the first sTTI with the long TTI, wherein the first sTTI may also be defined as a sidelink resource to be observed by the UE. Alternatively, this can be done by energy detection within the first OFDM symbol of the long TTI or on clear channel access (CCA) slot basis as known in WiFi or stand-alone LTE-Unlicensed or Licensed Assisted Access (LAA);

by discontinuous transmission (DTX) detection methods available in the UE;

by using a sensing implementation as part of a Listen-before-talk (LBT) method available in the UE; or by observing specific transmissions from the prioritized users, e.g. based on its user identities (this way, the resource is not falsely determined as used already, if e.g. energy from another neighboring cell is received).

If no on-going transmissions are detected and the low-priority users have UL data to transmit, they are allowed to utilize the otherwise un-utilized long TTI.

In an embodiment, the UL transport block by the low priority users may be already prepared after receiving a pre-scheduling grant, e.g. a Fast Uplink Access grant, resulting into lower processing time and thus better utilization of resources, since the users do not have to wait extra decoding/encoding time.

In a further embodiment, the eNB may group the users based on information such as signal strength and/or a geographical location of the users. A common Fast Uplink Access grant may be used to provide a group-wise pre-allocation of resources. For example, the same long TTI which is allocated to high priority user may also be allocated to the group of low-priority users. These low-priority users may perform a listen-before-talk (LBT) procedure or any similar procedure to compete with each other for the long TTIs not being utilized by the high priority user(s). In a further embodiment, a further prioritization amongst the low-priority users may be performed. This may allow for further capacity improvements in case of sporadic transmissions.

Figure 4:
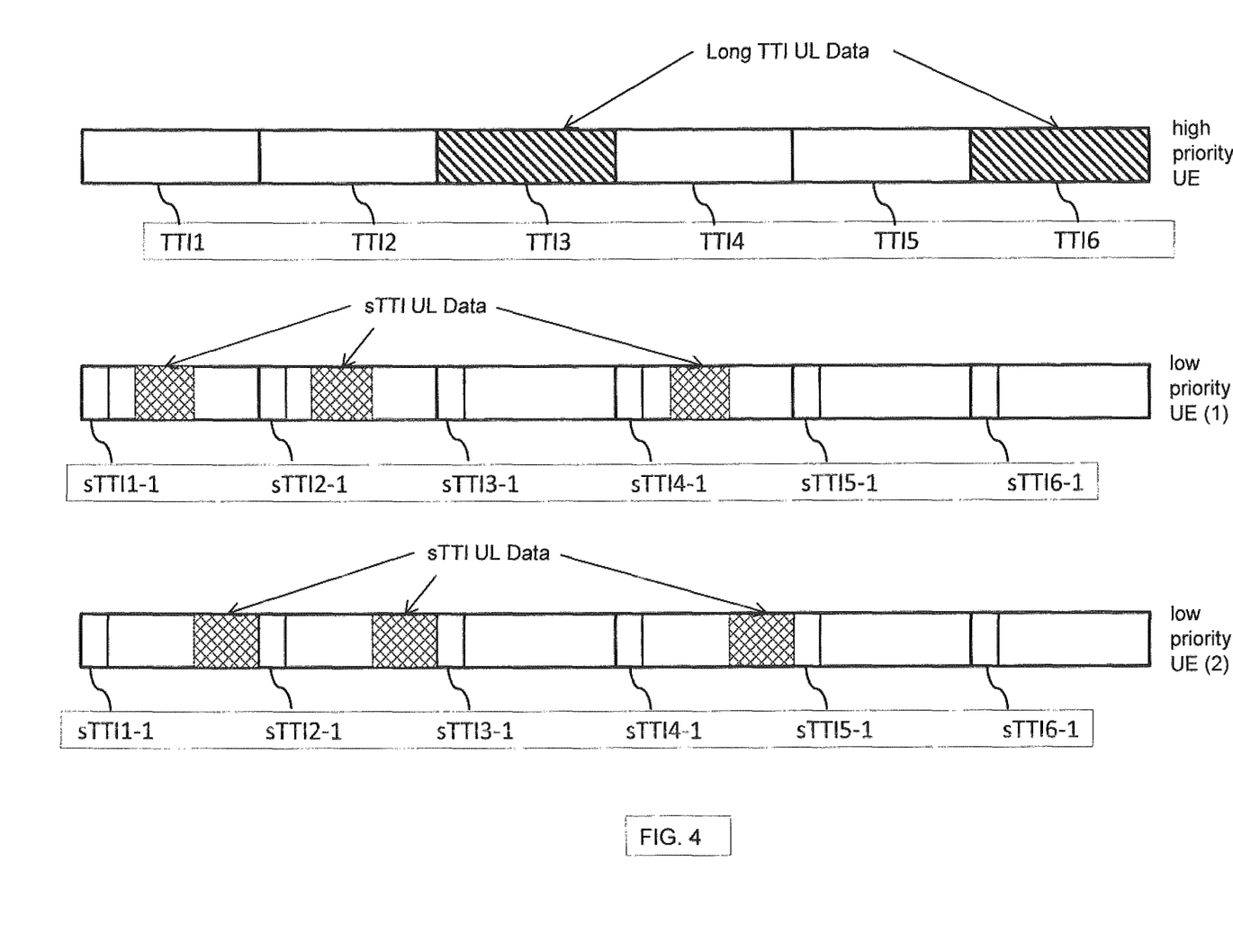
FIG. 4 shows a third exemplary timing diagram for long TTI and short TTI assignments with respect to UEs of different priority levels, wherein a plurality of low priority UEs share UL resources not being used by a high priority UE.

FIG. 4 shows a third example for a persistent resource allocation of long TTIs by the eNB 110 to a prioritized or primary users (e.g. UE 120-1). By way of example two low priority or secondary UEs (e.g. UE 120-2) get resource allocations of short TTI UL resources of the same long TTIs. However, the secondary users are only allowed to use such resources for UL transmission, if the primary user(s) do not utilize them for UL transmission. By way of example, the secondary users perform a sensing (e.g. of the first sTTI in each TTI) as discussed above. Further by way of example each of the two secondary users get selected sTTIs out of the plurality of sills of each non-utilized long TTI. Such sTTI selection may be performed by predefined algorithms, by way of competition amongst the secondary users (e.g. by performing LBT) or by way of a further prioritization amongst the secondary users.

As discussed, although the low priority users are pre-configured to use the pre-allocated resources, e.g. the Fast Uplink Access SPS-based resource allocation, they may only use such resources, if the channel is sensed as being not utilized already by the prioritized user (thus the meaning of Fast Uplink Access grant in the described context may be different from the current meaning that the resources can be used without any further condition).

In an embodiment configuration, which may be done by RRC signaling, also a UE identity of the prioritized user can be provided to the secondary users, which may ease its implementation of sensing, if the resource is used already. Alternatively, this information (mandatory application of sensing condition, UE-identity) may also be provided within the pre-allocating scheduling grant to the secondary users.

Figure 5:
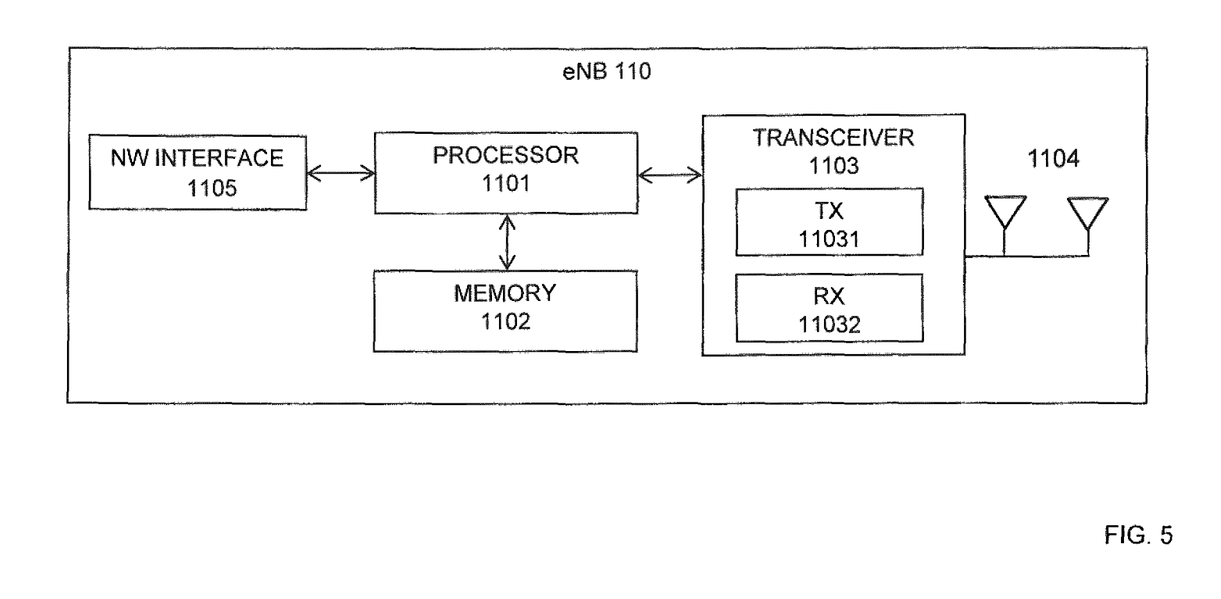
FIG. 5 shows an exemplary physical block diagram of the eNB.

As shown in FIG. 5, the base station or eNB 110 includes a node processor 1101, a node memory 1102, a node transceiver 1103, one or a plurality of node antennas 1104, and a network interface 1105. The node processor 1101 is coupled to the node memory 1102, to the network interface 1105, and to the node transceiver 1103. The node transceiver 1103 is further coupled to the one or the plurality of node antennas 1104. The node transceiver 1103 comprises a transmission circuit TX 11031 and a receiver circuit RX 11032. In particular embodiments, some (or all) of the functionality described above as being provided by eNB may be provided by the node processor 1101 executing respective instructions stored on a computer-readable medium, such as the node memory 1102. Alternative embodiments of the eNB may include additional components responsible for providing additional functionality, including any of the functionality identified above and/or any functionality necessary to support the solution described above.

Figure 6:
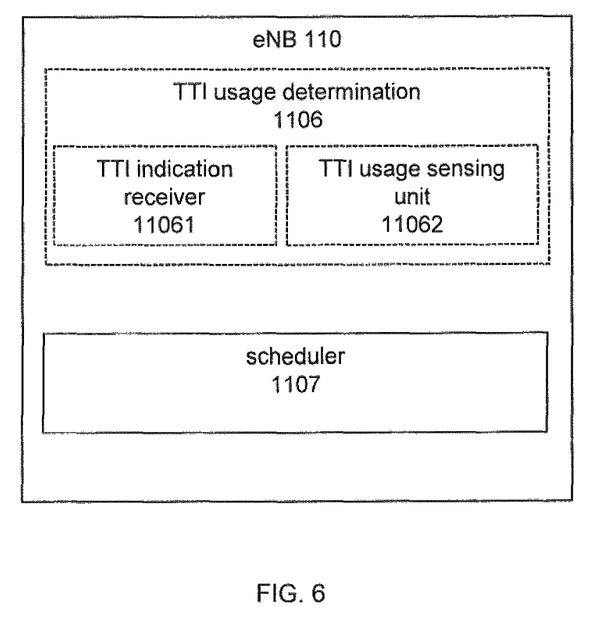
FIG. 6 shows an exemplary functional block diagram of the eNB.

As shown in FIG. 6, an example base station or eNB 110 adapted for granting uplink, UL, transmission resources to one or a plurality of user equipments, UEs 120-1, 120-2 includes scheduler 1107 configured for granting an uplink transmission resource of a fraction of a certain TTI to a second UE 120-2, if it is detected that the uplink resource is not used for uplink transmission in the certain TTI by the first UE 120-1.

The ENB 110 may further comprise an uplink resource usage determination unit (1106) that is adapted to detect that the uplink resource is not used for uplink transmission in the certain TTI by the first UE 120-1.

The determination unit 1106 may be implemented by a TTI indication receiver 11061 for receiving an indication from the first UE 120-1 that the certain TTI is not going to be used.

The determination unit 1106 may be alternatively or additionally implemented by a TTI sensing unit 11062 for sensing fa ono-usage of the certain TTI by the first UE 120-1.

Figure 7:
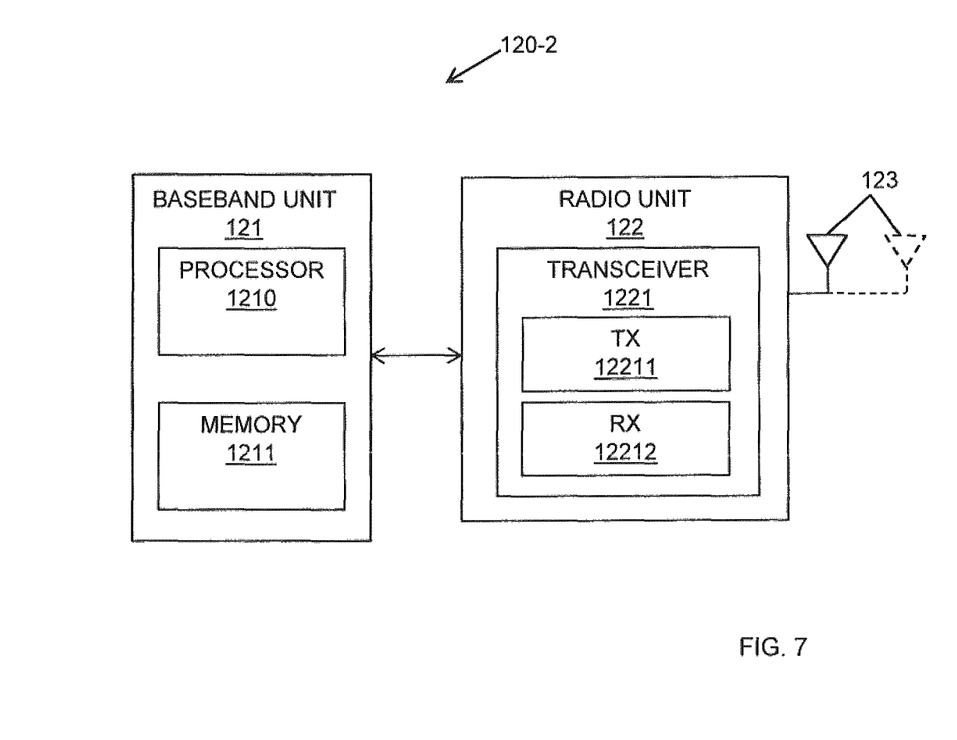
FIG. 7 shows an exemplary physical block diagram of the UEs.

As shown in FIG. 7, an example wireless terminal or UE 120-2 includes a baseband unit 121, a radio unit 122 and one or a plurality of antennas 123. The baseband unit 121 is coupled to the radio unit 122. The baseband unit 121 comprises a device processor 1211 and a device memory 1212. The radio unit 122 comprises a transceiver 1221 that is coupled to the one or a plurality of antennas 123. The transceiver comprises a transmission circuit TX 12211 and a receiver circuit RX 12212. In particular embodiments, some or all of the functionality described above as being provided by above-described UEs, MTC or M2M devices, and/or any other types of wireless communication devices may be provided by the device processor 1211 executing instructions stored on a computer-readable medium, such as the device memory 1211. Alternative embodiments of the wireless communication device may include additional components beyond those shown here that may be responsible for providing certain aspects of the device's functionality, including any of the functionality described above and/or any functionality necessary to support the solution described above.

Figure 8:
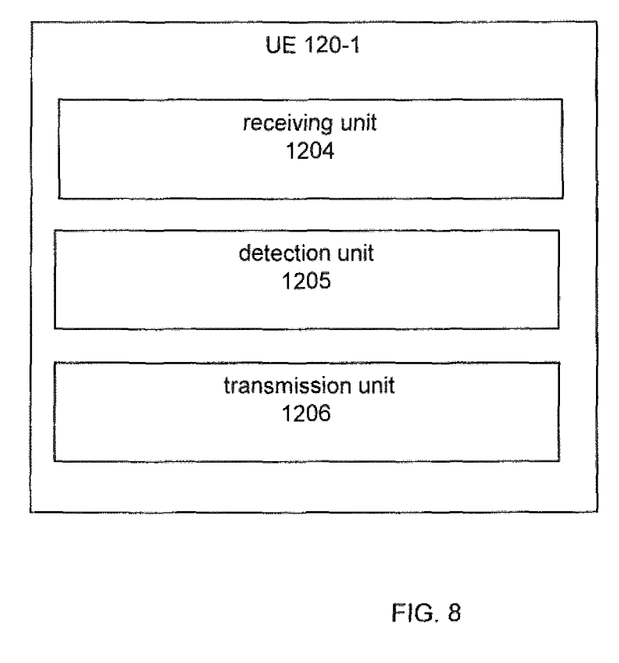
FIG. 8 shows an exemplary functional block diagram of a prioritized UE.

As shown in FIG. 8, an example first (prioritized) UE 120-1 configured for supporting an eNB 110 to grant for uplink, UL, resource to a second (non-prioritized) UE 120-2 includes the following exemplary functional units:
   a receiver 1204 configured for receiving an allocation of an uplink resource over one or a plurality of transmission time intervals, TTIs;
   a detector 1205 configured for detecting that the uplink resource with respect to a certain TTI is or will not be used for uplink transmission by the UE 120-1; and
   a transmitter 1206 adapted for sending to the eNB (110), in response to the detection, an information indicative of that the uplink resource of the certain TTI is not used.

Figure 9:
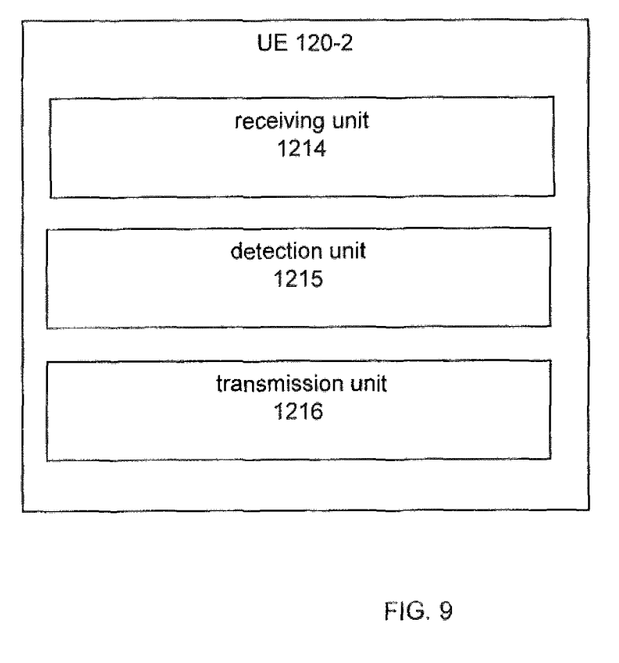
FIG. 9 shows an exemplary functional block diagram of a non-prioritized UE.

As shown in FIG. 9, an example second (non-prioritized) UE 120-2 configured for using an uplink resource that has been allocated to a first (prioritized) UE 120-1, includes the following exemplary functional units:
   a receiver (1214) configured for receiving from the eNB (110) a conditional grant for an uplink resource of one or a plurality of short TTIs of a certain TTI,
   a detector (1215) configured for performing a detection, if the further UE (120-1) is using the UL resource with respect to the certain TTI, and
   a transmitter (1216) configured using the conditional grant for an uplink transmission, only if the detection reveals that the further UE (120-1) is not using the UL resource with respect to the certain TTI.

Figure 10:
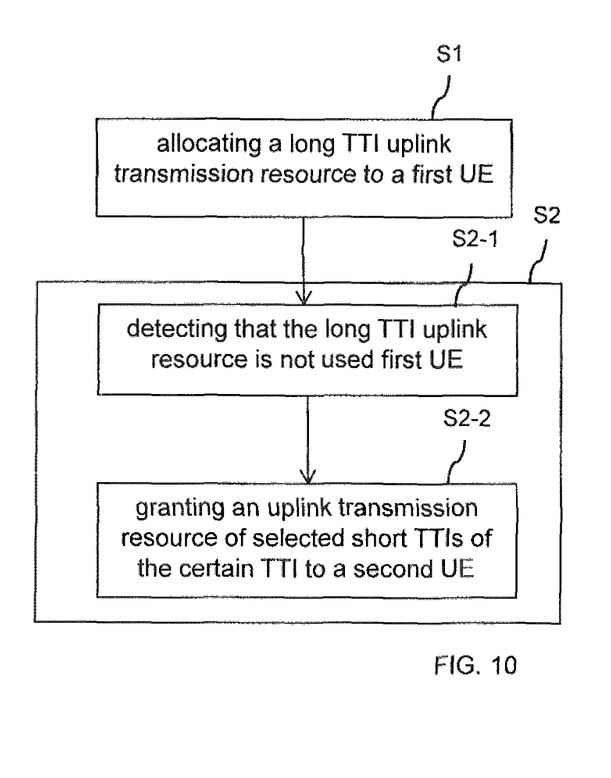
FIG. 10 shows steps of a first exemplary method performed in the eNB.

As shown in FIG. 10, an example method performed in the eNB 110 performs the following steps:
   in a first step S1, allocating a (persistent or semi-persistent) uplink transmission resource over one or a plurality of transmission time intervals, TTIs to a first UE 120-1; and
   in a second step S2, granting an uplink transmission resource of a fraction of a certain TTI to a second UE 120-2, if it is detected that the uplink resource is not used for uplink transmission in the certain TTI by the first UE 120-1.

According the example of FIG. 10, second step S2 may be realized by the following sub-steps S2-1 and S2-2:
   in the first sub-step S2-1, performing a detection that the uplink resource is not used for uplink transmission in a certain TTI by the first UE 120-1; and
   in the second sub-step S2-2, granting an uplink transmission resource of a fraction of the certain TTI to a second UE 120-2, in case that the uplink resource is not used by the first UE 120-1.

Figure 11:
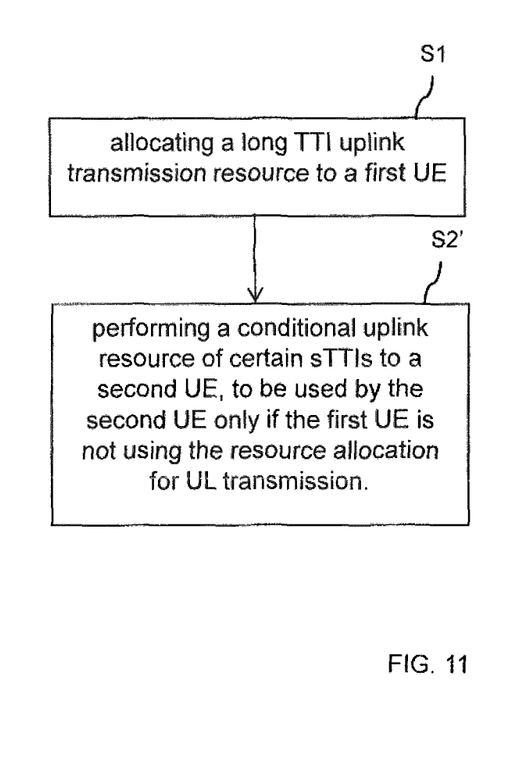
FIG. 11 shows steps of a second exemplary method performed in the eNB.

FIG. 11 shows an example method, wherein the eNB 110 performs the following alternative second step S2' instead of above-described $2^{nd}$ step S2:
   performing a conditional uplink resource allocation of one or a plurality of short TTIs of the TTI to a second UE 120-2, to be used by the second UE only if the first UE 120-1 is not using the resource allocation for UL transmission.

Figure 12:
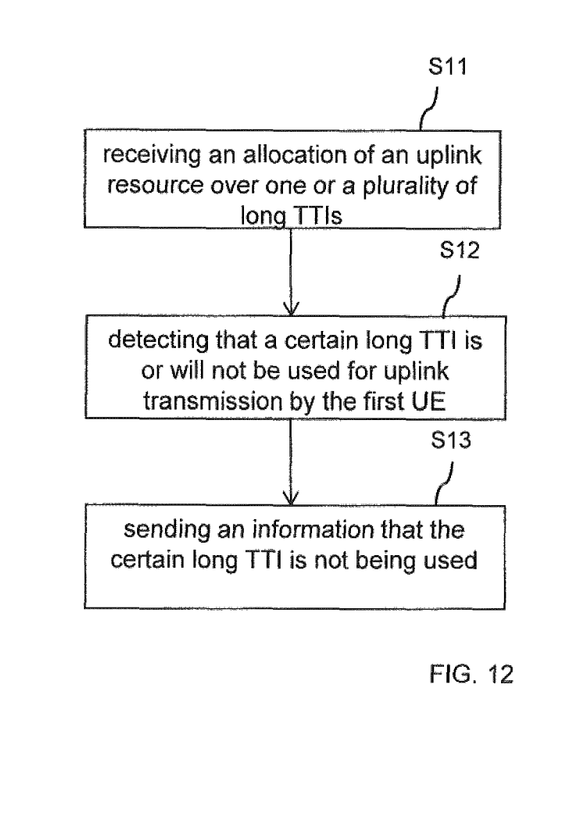
FIG. 12 shows steps of an exemplary method performed in the prioritized UE.

As shown in FIG. 12, an example first (prioritized) UE 120-1 configured for supporting an eNB 110 to grant for uplink, UL, resource to a second (non-prioritized) UE 120-2 performs the following steps:
   in a first step S11, receiving an allocation of an uplink resource over one or a plurality of transmission time intervals, TTIs;
   in a second step S12, detecting that the uplink resource with respect to a certain TTI is or will not be used for uplink transmission by the first UE 120-1; and
   in a third step S13, sending to the eNB 110, in response to the detection, an information indicative of that the uplink resource of the certain TTI is not used.

Figure 13:
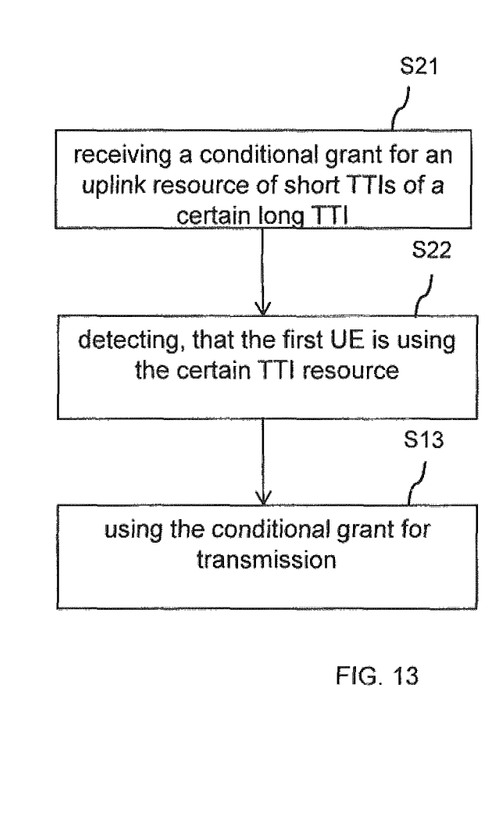
FIG. 13 shows steps of an exemplary method performed in the non-prioritized UE.

As shown in FIG. 13, an example second (non-prioritized) UE 120-2 configured for using an uplink resource that has been allocated to a first (prioritized) UE 120-1 performs the following steps:
   in a first step S21, receiving from the eNB 110 a conditional grant for an uplink resource of one or a plurality of short TTIs of a certain TTI, in a second step S22, performing a detection, if the first UE 120-1 is using the UL resource with respect to the certain TTI, and in a third step S23, using the conditional grant for an uplink transmission, only if the detection reveals that the first UE 120-1 is not using the UL resource with respect to the certain TTI.

The invention claimed is:

1. A method, in an access node or evolved Node B (eNB), for granting uplink (UL) transmission resources to one or a plurality of user equipments (UEs), the method comprising:
    allocating an uplink transmission resource over one or a plurality of transmission time intervals (TTIs) to a first UE; and
    granting an uplink transmission resource of a fraction of a certain TTI to a second UE, in response to a detection indicating that the uplink resource is not used for uplink transmission in the certain TTI by the first UE.

2. The method of claim 1:
    wherein the granting the uplink transmission resource of a fraction of a certain TTI to a second UE comprises:
        performing the detection that the uplink resource is not used for uplink transmission in a certain TTI by the first UE; and
        in response to the detection, granting an uplink transmission resource of a fraction of the certain TTI to a second UE; and
    wherein the TTI is sub-divided into a defined number of subsequent short TTIs; and
    wherein the detection is performed with respect to the first short TTI.

3. The method of claim 2, wherein the fraction of the TTI being granted to the second UE comprises one or a plurality of the short TTIs following the first short TTI.

4. The method of claim 3, wherein the detection is performed by sensing that the uplink resource is not used by the first UE in the certain TTI.

5. The method of claim 4, wherein the eNB performs the detection based on an estimation of a received power of an uplink transmission of the first UE.

6. The method of claim 5, wherein the eNB detects that no UL transmission has been performed, if an estimated power is below a certain power threshold.

7. The method of claim 1:
    wherein the granting the uplink transmission resource of a fraction of a certain TTI to a second UE comprises:
        performing the detection that the uplink resource is not used for uplink transmission in a certain TTI by the first UE; and
        in response to the detection, granting an uplink transmission resource of a fraction of the certain TTI to a second UE; and
    wherein the detection is performed by receiving an information indicative of that the uplink resource is not used by the first UE.

8. The method of claim 1, wherein the granting the uplink transmission resource of a fraction of a certain TTI to a second UE comprises performing a conditional uplink resource allocation of one or a plurality of short TTIs of the TTI to a second UE, to be used by the second UE only if the first UE is not using the resource allocation for UL transmission.

9. The method of claim 8:
    wherein the eNB performs a grouping of plurality of second UEs depending on a signal strength, a geographical location, and/or a given preference;
    wherein the one or a plurality of short TTIs of the TTI is granted to a plurality of second UEs within one group; and
    wherein the plurality of second UEs perform an apportionment of the one or the plurality of granted short TTI resources based on a further prioritization amongst the plurality of second UEs.

10. An evolved Node B (eNB) adapted for granting uplink (UL) transmission resources to one or a plurality of user equipments (UEs), the eNB comprising:
    processing circuitry coupled to the one or more interfaces for signal exchange; and
    memory operatively coupled to the processing circuitry and containing instructions executable by the processing circuitry whereby the eNB is operative to:
        allocate an uplink transmission resource over a transmission time interval (TTI) to a first UE; and
        grant an uplink transmission resource of a fraction of a certain TTI to a second UE, in response to a detection indicating that the uplink resource is not used for uplink transmission in the certain TTI by the first UE.

11. The eNB of claim 10:
    wherein the TTI is sub-divided into a defined number of subsequent short TTIs; and
    wherein the detection is performed with respect to the first short TTI.

12. The eNB of claim 11, wherein the instructions are such that the eNB is operative to grant the fraction of the TTI to the second UE comprising one or a plurality of the short TTIs following the first short TTI.

13. The eNB of claim 12, wherein the instructions are such that the eNB is operative to perform the detection by sensing that the uplink resource is not used from the first UE.

14. The eNB of claim 13, wherein the instructions are such that the eNB is operative to perform the detection based on an estimation of a received power of an uplink transmission of the first UE.

15. The eNB of claim 14, wherein the instructions are such that the eNB is operative to detect that no UL transmission is being performed if an estimated power is below a certain power threshold.

16. The eNB of claim 10, wherein the instructions are such that the eNB is operative to perform the detection by receiving an information indicative of that the uplink resource is not used by the first UE.

17. The eNB of claim 10, wherein the instructions are such that the eNB is operative to grant the uplink transmission resource of the fraction of the certain TTI to the second UE by performing a conditional uplink resource allocation of one or a plurality of short TTIs of the TTI to a second UE, to be used by the second UE only if the first UE is not using the resource allocation for UL transmission.

18. The eNB of claim 17, wherein the instructions are such that the eNB is operative to:
    perform a grouping of plurality of second UEs depending on a signal strength, a geographical location, and/or a given preference; and
    grant the one or a plurality of short TTIs of the TTI to a plurality of second UEs within one group.

* * * * *